United States Patent Office 3,431,282
Patented Mar. 4, 1969

3,431,282
PHTHALIDE COMPOUNDS
Ryohei Oda, Ushiwaka-cho, Kita-ku, Kyoto, Hiroshi Fujii, Amagasaki, and Hiroyuki Moriga, Nishinomiya, Japan (all % Kanzaki Paper Mfg. Co., Ltd., 4, Ginza Higashi 4, Chuo-ku, Tokyo, Japan)
No Drawing. Filed July 17, 1963, Ser. No. 295,803
U.S. Cl. 260—343.4   8 Claims
Int. Cl. C07d 5/38

The present invention relates to an improved process for the production of 3,3-bis-(4-dialkylaminophenyl)-phthalide, which process provides high yield of the desired phthalide compound in a relatively simple manner.

In accordance with the present invention, a dialkyl aniline is first reacted with aluminum chloride to form a salt therebetween and this preformed salt is reacted with phthalic anhydride at elevated temperature to produce the desired phthalide compound as is illustrated by the following equations:

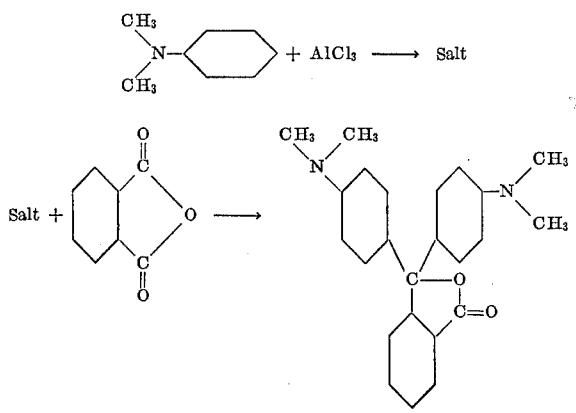

To more particularly illustrate the process, 2 mols of aluminum chloride are added to 2 mols of dimethyl-aniline, with stirring and the mixture undergoes a reaction forming the desired salt. After the salt-forming reaction is completed, the salt is heated to 130° C. and 1 mol of phathalic anhydride is slowly added, with stirring, and, after the mixture is maintained at said elevated temperature for 4 hours, the mixture is cooled to room temperature and processed for the recovery of the phthalide compound as will be described hereinafter.

It is desired to point out that it is essential that aluminum chloride salt formation precede the presence of phthalic anhydride. Thus, when all three components are simply mixed together and heated to the same reaction temperature (130° C.), the primary reaction which takes place is completely different as illustrated by the following equation:

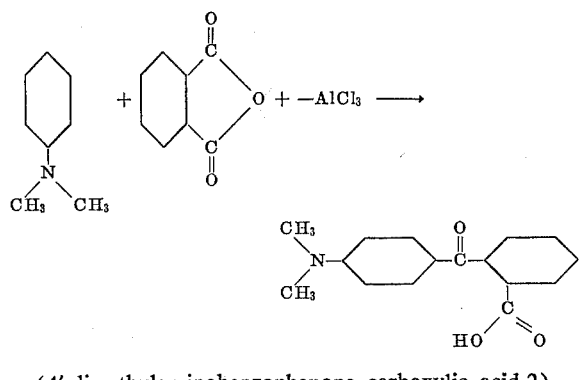

(4'-dimethylaminobenzophenone carboxylic acid-2)

When reference is made to dialkyl aniline, it is to be understood that lower alkyl substituents on the nitrogen atom are preferred, e.g, alkyl groups containing from 1–4 carbon atoms. Dimethyl aniline is the preferred compound.

The reaction temperature is desirably in excess of 100° C., up to about 200° C., a reaction temperature in the range of from 110–150° C. being preferred. The point to be observed is that the reaction is conducted in the liquid phase and elevated temperatures are employed to cause the reaction to move forward.

The phthalide compound is recoverable from the reaction product in accordance with the present invention by dissolving the same in dilute aqueous mineral acid, preferably hydrochloric acid which is partially neutralized to a pH of 2 to 3 with alkali metal hydroxide, such as sodium hydroxide, and then buffered with a fatty acid salt of an alkali metal, preferably sodium acetate, to a pH of from 3 to 5, but preferably not in excess of pH 4 to cause the phthalide compound to crystallize selectively in yields of approximately 80%. The purity of the product may be increased by recrystallization in known manner, benzol being an appropriate solvent, to provide colorless crystals having a melting point of from 189–190° C.

The invention will be more fully illustrated by the following examples.

EXAMPLE 1

30 grams of anhydrous aluminum are added gradually to 30 grams of dimethyl aniline, with stirring, to cause the formation of the aluminum chloride salt. If desired, the reaction mixture may be warmed to a temperature of from 50–70° C. in order to insure the completeness of the salt-forming reaction.

After the salt has been formed, phthalic anhydride for every 2 mols of dimethyl aniline, the temperature being maintained in the range of 100–110° C. with agitation, for one-half hour. To complete the reaction, the temperature is increased to 130° C. and maintained at this temperature for a period of four hours.

The reaction product is then cooled and contacted with a 5% aqueous solution of hydrochloric acid at a temperature of 70–80° C. to cause the reaction product to dissolve completely. The smallest amount of 5% hydrochloric acid enabling complete dissolution is used. After dissolving has been completed, the solution is desirably diluted with water (400 cc. of water being used in the present example). When the diluted solution has cooled to room temperature, a 5% solution of sodium hydroxide is added to a pH of approximately 2.5, causing a limited crystallization of the desired phthalide compound which is removed by filtering. The filtrate is then buffered to a pH of 4 by the addition of sodium acetate to crystallize a further proportion of the desired phthalide compound which is also removed by filtering. The filtered materials are dried under vacuum and recrystallized with benzene or ethyl alcohol to obtain a product having a melting point of from 188–190° C. in a yield of 70%.

EXAMPLE 2

Example 1 is repeated employing 30 grams of diethyl aniline in place of 30 grams of dimethyl aniline. White crystals having a melting point of from 128–129° C. are obtained in a yield of about 80%.

The process of Example 1 has also been employed using diisopropyl aniline and dibutyl aniline to obtain white crystalline phthalide dyes exactly as in the previous examples. The yield using dibutyl aniline was smaller, but an effective yield is still obtained.

While the invention has been illustrated using a 5% solution of hydrochloric acid, it should be appreciated that the concentration of the acid is not a prime feature of the invention, concentrations of from 1–10% being broadly suitable.

The phthalide compounds of the present invention are known compounds useful as dye intermediates. More specifically, they can be converted to introduce an amine substituent in the 5 position to provide dyes which exhibit color when contacted with acidic clays.

The invention is defined in the claims which follow.

We claim:
1. A process for the production of 3,3-bis-(4-dialkylaminophenyl)-phthalide comprising reacting a dialkyl aniline-aluminum chloride salt with phthalic anhydride at an elevated temperature in the liquid phase.
2. A process as recited in claim 1 in which the alkyl groups of said dialkyl aniline contain from 1–4 carbon atoms.
3. A process as recited in claim 1 in which the reaction temperature is in the range of 110–150° C.
4. A process for the production of 3,3-bis-(4-dialkylaminophenyl)-phthalide comprising mixing together a dialkyl aniline and aluminum chloride in approximately equal molar proportions to cause the formation of a salt therebetween, and reacting said salt with phthalic anhydride at an elevated temperature in the liquid phase.
5. A process as recited in claim 4 in which said dialkyl aniline and said aluminum chloride are heated to a temperature up to about 70° C. to insure the completion of the salt-forming reaction.
6. A process for the production of 3,3-bis-(4-dialkylaminophenyl)-phthalide comprising reacting a dialkyl aniline-aluminum chloride salt with phthalic anhydride at an elevated temperature in the liquid phase, dissolving the reaction product in dilute mineral acid, partially neutralizing the mineral acid solution to a pH of from 3–4 by the addition thereto of alkali metal fatty acid salt to cause said phthalide compound to crystallize selectively from said solution.
7. A process as recited in claim 6 in which the phthalide-containing reaction product is dissolved in aqueous hydrochloric acid of approximately 5% strength, the hydrochloric acid solution being partially neutralized with sodium hydroxide and buffered with sodium acetate.
8. A process of recoverying 3,3,-bis-(4-dialkylaminophenyl)-phthalide from a mixture containing the same comprising dissolving said mixture in dilute aqueous mineral acid, partially neutralizing the solution to a pH of from 2–3 with alkali metal hydroxide and then buffering the partially neutralized solution with a fatty acid salt of an alkali metal to a pH of from 3–4 to selectively crystallize said phthalide compound.

References Cited

UNITED STATES PATENTS

| Re. 23,024 | 8/1948 | Adams | 260—343.4 |
| 1,940,146 | 12/1933 | Roberts | 260—343 |
| 2,443,092 | 6/1948 | Adams | 260—343.4 |
| 2,742,483 | 4/1956 | Crounse | 260—343.4 |

FOREIGN PATENTS 718,711  11/1954  Great Britain.

OTHER REFERENCES

Monograph No. 87, Reinhold Pub. Co., New York (1941), pp. 156 and 157.

Thomas, Anhyd. Aluminum Chloride in Org. Chem., A.C.S.

WALTER A. MODANCE, *Primary Examiner.*

JAMES PATTEN, *Assistant Examiner.*